US006658444B1

(12) United States Patent
Walster et al.

(10) Patent No.: US 6,658,444 B1
(45) Date of Patent: Dec. 2, 2003

(54) METHOD AND APPARATUS FOR PERFORMING A MASK-DRIVEN INTERVAL DIVISION OPERATION

(75) Inventors: G. William Walster, Cupertino, CA (US); Dmitri Chiriaev, Campbell, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 517 days.

(21) Appl. No.: 09/710,453

(22) Filed: Nov. 9, 2000

(51) Int. Cl.[7] ............................................... G06F 7/52
(52) U.S. Cl. ...................................... 708/504; 708/650
(58) Field of Search ................................. 708/650, 653, 708/504

(56) References Cited

U.S. PATENT DOCUMENTS

| | | | | |
|---|---|---|---|---|
| 4,325,120 A | * | 4/1982 | Colley et al. | 711/202 |
| RE33,629 E | * | 7/1991 | Palmer et al. | 708/510 |
| 5,687,106 A | * | 11/1997 | Schwarz et al. | 708/499 |
| 6,044,454 A | * | 3/2000 | Schwarz et al. | 712/201 |
| 6,049,865 A | * | 4/2000 | Smith | 712/222 |
| 6,247,113 B1 | * | 6/2001 | Jaggar | 712/200 |

* cited by examiner

Primary Examiner—David H. Malzahn
(74) Attorney, Agent, or Firm—Park, Vaughan & Fleming LLP

(57) ABSTRACT

One embodiment of the present invention provides a system for performing a division operation between arithmetic intervals within a computer system. The system operates by receiving interval operands, including a first interval and a second interval, wherein the first interval is to be divided by the second interval to produce a resulting interval. Next, the system uses the operand values to create a mask. The system uses this mask to perform a multi-way branch, so that an execution flow of a program performing the division operation is directed to code that is tailored to compute the resulting interval for specific relationships between the interval operands and zero. In one embodiment of the present invention, creating the mask additionally involves, determining whether the first and/or second intervals are empty, and modifying the mask so that the multi-way branch directs the execution flow of the program to the appropriate code for this case. In one embodiment of the present invention, if the first interval is empty or if the second interval is empty, the multi-way branch directs the execution flow of the program to code that sets the resulting interval to be empty.

45 Claims, 5 Drawing Sheets

$$X \equiv [\underline{x}, \bar{x}] \equiv \{x \in \Re | \underline{x} \le x \le \bar{x}\}$$

$$Y \equiv [\underline{y}, \bar{y}] \equiv \{y \in \Re | \underline{y} \le y \le \bar{y}\}$$

(1) $X + Y = [\downarrow \underline{x} + \underline{y}, \uparrow \bar{x} + \bar{y}]$ (2) $X - Y = [\downarrow \underline{x} - \bar{y}, \uparrow \bar{x} - \underline{y}]$ (3) $X \times Y = [min(\downarrow \underline{x} \times \underline{y}, \underline{x} \times \bar{y}, \bar{x} \times \underline{y}, \bar{x} \times \bar{y}), max(\uparrow \underline{x} \times \underline{y}, \underline{x} \times \bar{y}, \bar{x} \times \underline{y}, \bar{x} \times \bar{y})]$ (4) $X/Y = [min(\downarrow \underline{x}/\underline{y}, \underline{x}/\bar{y}, \bar{x}/\underline{y}, \bar{x}/\bar{y}), max(\uparrow \underline{x}/\underline{y}, \underline{x}/\bar{y}, \bar{x}/\underline{y}, \bar{x}/\bar{y})], if\ 0 \notin Y$ $X/Y = \Re*, if\ 0 \in Y$

FIG. 5

(0)  If $X == \emptyset$ or $Y == \emptyset$, $P = \emptyset$ (1)  If $X > 0$ and $Y > 0$, $P = [inf(X)/sup(Y), sup(X)/inf(Y)]$ (2)  If $X > 0$ and $Y < 0$, $P = [sup(X)/sup(Y), inf(X)/inf(Y)]$ (3)  If $X < 0$ and $Y > 0$, $P = [inf(X)/inf(Y), sup(X)/sup(Y)]$ (4)  If $X < 0$ and $Y < 0$, $P = [sup(X)/inf(Y), inf(X)/sup(Y)]$ (5)  If $0$ in $X$ and $Y > 0$, $P = [inf(X)/inf(Y), sup(X)/inf(Y)]$ (6)  If $0$ in $X$ and $Y < 0$, $P = [sup(X)/sup(Y), inf(X)/sup(Y)]$ (7)  If $0$ in $Y$, $P = [-inf, +inf]$

FIG. 7

METHOD AND APPARATUS FOR PERFORMING A MASK-DRIVEN INTERVAL DIVISION OPERATION

The subject matter of this application is related to the subject matter in a non-provisional application by the same inventor(s) as the instant application and filed on the same day as the instant application entitled, "Method and Apparatus for Performing a Mask-Driven Interval Multiplication Operation," having Ser. No. 09/710,454, and filing date Nov. 9, 2000.

BACKGROUND

1. Field of the Invention

The present invention relates to performing arithmetic operations on interval operands within a computer system. More specifically, the present invention relates to a method and an apparatus for performing a fast mask-driven division operation between interval operands.

2. Related Art

Rapid advances in computing technology make it possible to perform trillions of computational operations each second. This tremendous computational speed makes it practical to perform computationally intensive tasks as diverse as predicting the weather and optimizing the design of an aircraft engine. Such computational tasks are typically performed using machine-representable floating-point numbers to approximate values of real numbers. (For example, see the Institute of Electrical and Electronics Engineers (IEEE) standard 754 for binary floating-point numbers.)

In spite of their limitations, floating-point numbers are generally used to perform most computational tasks.

One limitation is that machine-representable floating-point numbers have a fixed-size word length, which limits their accuracy. Note that a floating-point number is typically encoded using a 32, 64 or 128-bit binary number, which means that there are only $2^{32}$, $2^{64}$ or $2^{128}$ possible symbols that can be used to specify a floating-point number. Hence, most real number values can only be approximated with a corresponding floating-point number. This creates estimation errors that can be magnified through even a few computations, thereby adversely affecting the accuracy of a computation.

A related limitation is that floating-point numbers contain no information about their accuracy. Most measured data values include some amount of error that arises from the measurement process itself. This error can often be quantified as an accuracy parameter, which can subsequently be used to determine the accuracy of a computation. However, floating-point numbers are not designed to keep track of accuracy information, whether from input data measurement errors or machine rounding errors. Hence, it is not possible to determine the accuracy of a computation by merely examining the floating-point number that results from the computation.

Interval arithmetic has been developed to solve the above-described problems. Interval arithmetic represents numbers as intervals specified by a first (left) endpoint and a second (right) endpoint. For example, the interval [a, b], where a<b, is a closed, bounded subset of the real numbers, R, which includes a and b as well as all real numbers between a and b. Arithmetic operations on interval operands (interval arithmetic) are defined so that interval results always contain the entire set of possible values. The result is a mathematical system for rigorously bounding numerical errors from all sources, including measurement data errors, machine rounding errors and their interactions.

Note that the first endpoint normally contains the "infimum", which is the largest number that is less than or equal to each of a given set of real numbers. Similarly, the second endpoint normally contains the "supremum", which is the smallest number that is greater than or equal to each of the given set of real numbers. Note that the infimum of an interval X can be represented as inf(X), and the supremum can be represented as sup(X).

However, computer systems are presently not designed to efficiently handle intervals and interval computations. Consequently, performing interval operations on a typical computer system can be hundreds of times slower than performing conventional floating-point operations. In addition, without a special representation for intervals, interval arithmetic operations fail to produce results that are as narrow as possible.

What is needed is a method and an apparatus for efficiently performing arithmetic operations on intervals with results that are as narrow as possible. (Interval results that are as narrow as possible are said to be "sharp".)

One problem in performing an interval division operation is that the procedure used to perform an interval division operation varies depending upon whether the interval operands are less than zero, greater than zero or contain zero. Hence, code that performs an interval division operation typically performs a number of tests, by executing "if" statements, to determine relationships between the interval operands and zero. Executing these "if" statements can cause an interval division operation to require a large amount of time to perform.

Another problem in performing an interval division operation is that the system must determine if any of the interval operands are empty, because the result of the interval division operation is the empty interval if any of the interval operands are empty. Testing interval operands for emptiness also involves executing "if" statements, which further increases the amount of time required to perform an interval division operation.

What is needed is a method and an apparatus for performing an interval division operation between interval operands that does not involve executing time consuming if statements in order to test the interval operands.

SUMMARY

One embodiment of the present invention provides a system for performing a division operation between arithmetic intervals within a computer system. The system operates by receiving interval operands, including a first interval and a second interval, wherein the first interval is to be divided by the second interval to produce a resulting interval. Next, the system uses the values of the interval operands to create a mask. The system next performs a multi-way branch based upon the mask, so that an execution flow of a program performing the division operation is directed to the code that computes the resulting interval for each specific relationship between the interval operands.

In one embodiment of the present invention, creating the mask additionally involves, determining whether the first and/or second intervals is empty, and modifying the mask accordingly. In this embodiment, performing the multi-way branch involves directing the execution flow of the program to the code that computes the resulting interval, depending upon whether the first and/or second interval is empty.

In one embodiment of the present invention, if the first interval is empty or if the second interval is empty, the multi-way branch directs the execution flow of the program to code that sets the resulting interval to be empty.

In one embodiment of the present invention, if the first interval is greater than zero and the second interval is greater than zero, performing the multi-way branch directs the execution flow of the program to code that computes a left endpoint of the resulting interval as a left endpoint of the first interval divided by a right endpoint of the second interval. This code also computes a right endpoint of the resulting interval as a right endpoint of the first interval divided by a left endpoint of the second interval.

In one embodiment of the present invention, if the first interval is greater than zero and the second interval is less than zero, performing the multi-way branch directs the execution flow of the program to code that computes a left endpoint of the resulting interval as a right endpoint of the first interval divided by a right endpoint of the second interval. This code also computes a right endpoint of the resulting interval as a left endpoint of the first interval divided by a left endpoint of the second interval.

In one embodiment of the present invention, if the first interval is less than zero and the second interval is greater than zero, performing the multi-way branch directs the execution flow of the program to code that computes a left endpoint of the resulting interval as a left endpoint of the first interval divided by a left endpoint of the second interval. This code also computes a right endpoint of the resulting interval as a right endpoint of the first interval divided by a right endpoint of the second interval.

In one embodiment of the present invention, if the first interval is less than zero and the second interval is less than zero, performing the multi-way branch directs the execution flow of the program to code that computes a left endpoint of the resulting interval as a right endpoint of the first interval divided by a left endpoint of the second interval. This code also computes a right endpoint of the resulting interval as a left endpoint of the first interval divided by a right endpoint of the second interval.

In one embodiment of the present invention, if the first interval includes zero and the second interval is greater than zero, performing the multi-way branch directs the execution flow of the program to code that computes a left endpoint of the resulting interval as a left endpoint of the first interval divided by a left endpoint of the second interval. This code also computes a right endpoint of the resulting interval as a right endpoint of the first interval divided by a left endpoint of the second interval.

In one embodiment of the present invention, if the first interval includes zero and the second interval is less than zero, performing the multi-way branch directs the execution flow of the program to code that computes a left endpoint of the resulting interval as a right endpoint of the first interval divided by a right endpoint of the second interval. This code also computes a right endpoint of the resulting interval as a left endpoint of the first interval divided by a right endpoint of the second interval.

In one embodiment of the present invention, as a consequence of performing endpoint divisions, if either the left endpoint or the right endpoint of the resulting interval is set to a default NaN value (not-a-number), the system additionally sets the left endpoint of the resulting interval to negative infinity, and sets the right endpoint of the resulting interval to positive infinity.

In one embodiment of the present invention, if the second interval includes zero, performing the multi-way branch directs the execution flow of the program to code that sets the left endpoint of the resulting interval to negative infinity, and sets the right endpoint of the resulting interval to positive infinity.

BRIEF DESCRIPTION OF THE FIGURES

FIG. 5 illustrates four different interval operations in accordance with an embodiment of the present invention.

FIG. 7 illustrates how the result of an interval division operation is computed in accordance with an embodiment of the present invention.

Table 1 presents an example of pseudo-code to perform a mask-driven interval division operation in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated).

For example, the transmission medium may include a communications network, such as the Internet.

Computer System

Figure 1:
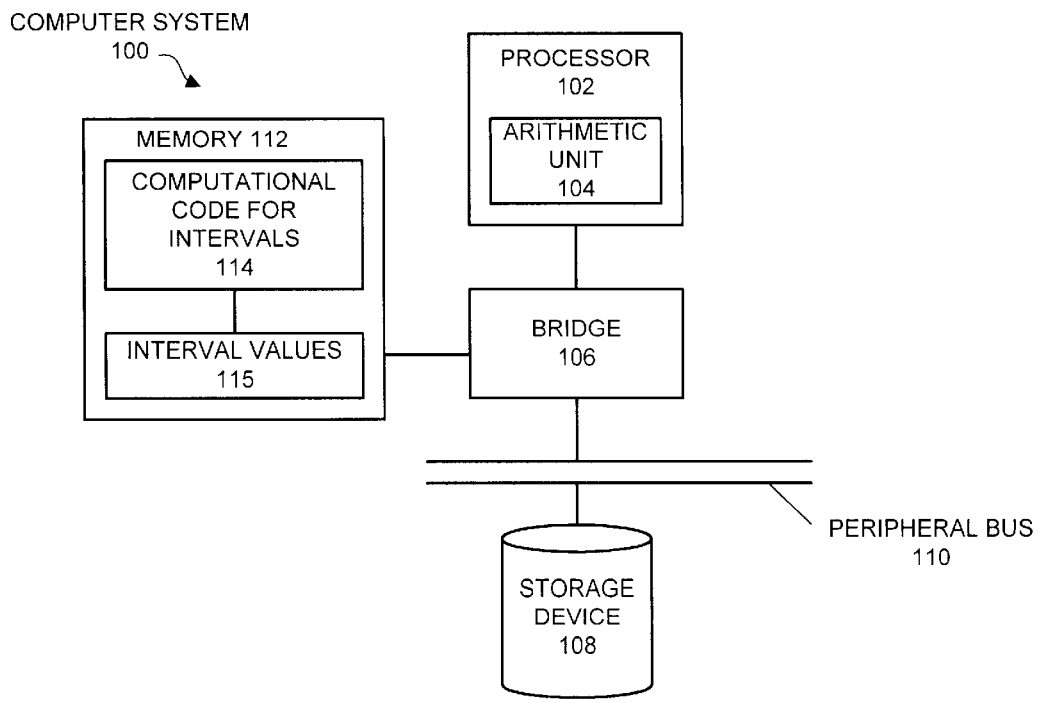
FIG. 1 illustrates a computer system in accordance with an embodiment of the present invention.

FIG. 1 illustrates a computer system 100 in accordance with an embodiment of the present invention. As illustrated in FIG. 1, computer system 100 includes processor 102, which is coupled to a memory 112 and a peripheral bus 110 through bridge 106. Bridge 106 can generally include any type of circuitry for coupling components of computer system 100 together.

Processor 102 can include any type of processor, including, but not limited to, a microprocessor, a mainframe computer, a digital signal processor, a personal organizer, a device controller and a computational engine within an appliance. Processor 102 includes an arithmetic unit 104, which is capable of performing computational operations using floating-point numbers.

Processor 102 communicates with storage device 108 through bridge 106 and peripheral bus 110. Storage device 108 can include any type of non-volatile storage device that can be coupled to a computer system. This includes, but is not limited to, magnetic, optical, and magneto-optical storage devices, as well as storage devices based on flash memory and/or battery-backed up memory.

Processor 102 communicates with memory 112 through bridge 106. Memory 112 can include any type of memory that can store code and data for execution by processor 102. As illustrated in FIG. 1, memory 112 contains computational code for intervals 114. Computational code 114 contains instructions for the interval operations to be performed on individual operands, or interval values 115, which are also stored within memory 112. This computational code 114 and these interval values 115 are described in more detail below with reference to FIGS. 2–5.

Note that although the present invention is described in the context of computer system 100 illustrated in FIG. 1, the present invention can generally operate on any type of computing device that can perform computations involving floating-point numbers. Hence, the present invention is not limited to the computer system 100 illustrated in FIG. 1.

Compiling and Using Interval Code

Figure 2:
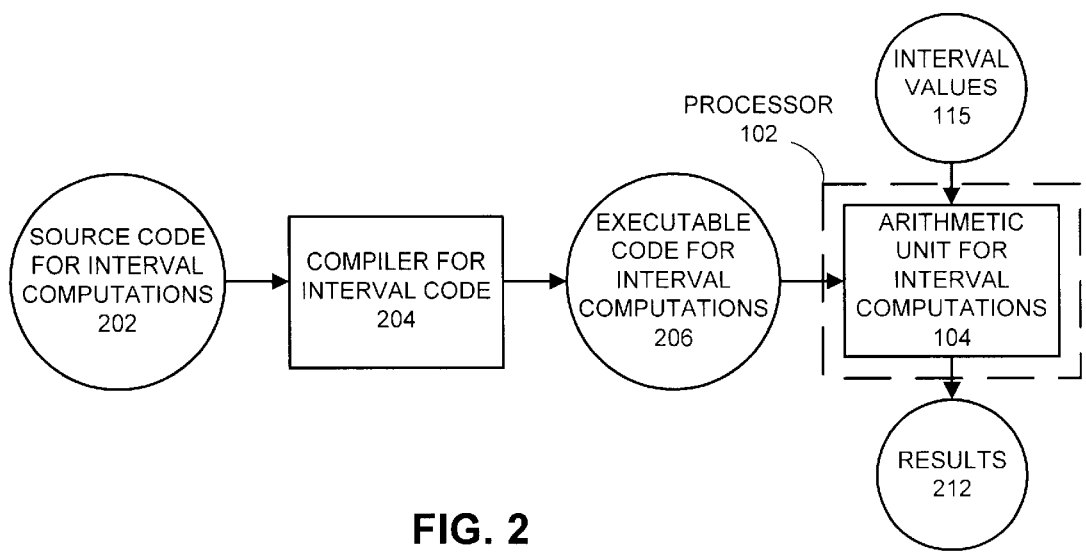
FIG. 2 illustrates the process of compiling and using code for interval computations in accordance with an embodiment of the present invention.

FIG. 2 illustrates the process of compiling and using code for interval computations in accordance with an embodiment of the present invention. The system starts with source code 202, which specifies a number of computational operations involving intervals. Source code 202 passes through compiler 204, which converts source code 202 into executable code form 206 for interval computations. Processor 102 retrieves executable code 206 and uses it to control the operation of arithmetic unit 104.

Processor 102 also retrieves interval values 115 from memory 112 and passes these interval values 115 through arithmetic unit 104 to produce results 212. Results 212 can also include interval values.

Note that the term "compilation" as used in this specification is to be construed broadly to include pre-compilation and just-in-time compilation, as well as use of an interpreter that interprets instructions at run-time. Hence, the term "compiler" as used in the specification and the claims refers to pre-compilers, just-in-time compilers and interpreters.

Arithmetic Unit for Intervals

Figure 3:
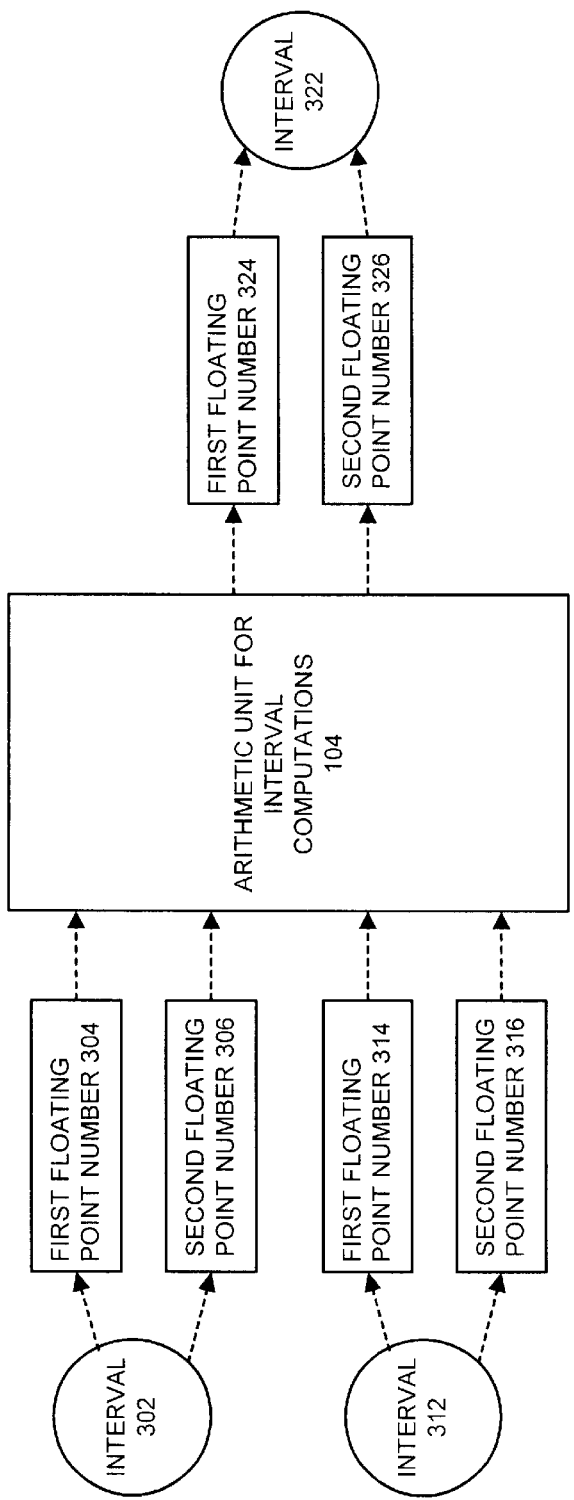
FIG. 3 illustrates an arithmetic unit for interval computations in accordance with an embodiment of the present invention.

FIG. 3 illustrates arithmetic unit 104 for interval computations in more detail accordance with an embodiment of the present invention. Details regarding the construction of such an arithmetic unit are well known in the art. For example, see U.S. patent applications Ser. Nos. 5,687,106 and 6,044,454, which are hereby incorporated by reference in order to provide details on the construction of such an arithmetic unit. Arithmetic unit 104 receives intervals 302 and 312 as inputs and produces interval 322 as an output.

In the embodiment illustrated in FIG. 3, interval 302 includes a first floating-point number 304 representing a first endpoint of interval 302, and a second floating-point number 306 representing a second endpoint of interval 302. Similarly, interval 312 includes a first floating-point number 314 representing a first endpoint of interval 312, and a second floating-point number 316 representing a second endpoint of interval 312. Also, the resulting interval 322 includes a first floating-point number 324 representing a first endpoint of interval 322, and a second floating-point number 326 representing a second endpoint of interval 322.

Note that arithmetic unit 104 includes circuitry for performing the interval operations that are outlined in FIG. 5. This circuitry enables the interval operations to be performed efficiently.

However, note that the present invention can also be applied to computing devices that do not include special-purpose hardware for performing interval operations. In such computing devices, compiler 204 converts interval operations into a executable code that can be executed using standard computational hardware that is not specially designed for interval operations.

Figure 4:
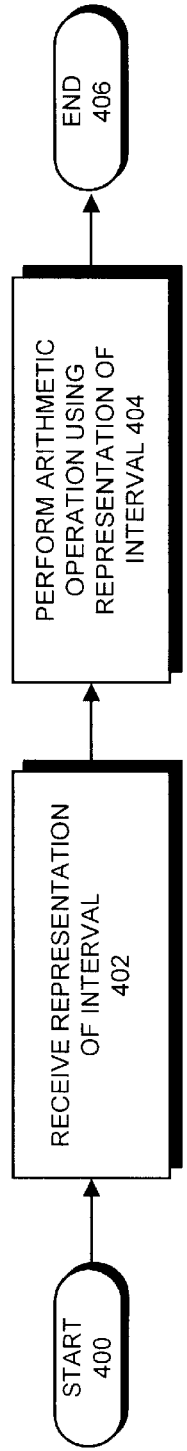
FIG. 4 is a flow chart illustrating the process of performing an interval computation in accordance with an embodiment of the present invention.

FIG. 4 is a flow chart illustrating the process of performing an interval computation in accordance with an embodiment of the present invention. The system starts by receiving a representation of an interval, such as first floating-point number 304 and second floating-point number 306 (step 402). Next, the system performs an arithmetic operation using the representation of the interval to produce a result (step 404). The possibilities for this arithmetic operation are described in more detail below with reference to FIG. 5.

Interval Operations

FIG. 5 illustrates four different interval operations in accordance with an embodiment of the present invention. These interval operations operate on the intervals X and Y. The interval X includes two endpoints, $\underline{x}$ denotes the lower bound of X, and $\overline{x}$ denotes the upper bound of X.

The interval X is a closed, bounded subset of the real numbers R (see line 1 of FIG. 5). Similarly the interval Y also has two endpoints and is a closed, bounded subset of the real numbers R (see line 2 of FIG. 5).

Note that an interval is a point or degenerate interval if X=[x, x]. Also note that the left endpoint of an interior interval is always less than or equal to the right endpoint. The set of extended real numbers, R* is the set of real numbers, R, extended with the two ideal points minus infinity and plus infinity:

$$R^* = R \cup \{-\infty\} \cup \{+\infty\}.$$

In the equations that appear in FIG. 5, the up arrows and down arrows indicate the direction of rounding in the next and subsequent operations. Directed rounding (up or down) is applied if the result of a floating-point operation is not machine-representable.

The addition operation X+Y adds the left endpoint of X to the left endpoint of Y and rounds down to the nearest floating-point number to produce a resulting left endpoint, and adds the right endpoint of X to the right endpoint of Y and rounds up to the nearest floating-point number to produce a resulting right endpoint.

Similarly, the subtraction operation X−Y subtracts the right endpoint of Y from the left endpoint of X and rounds down to produce a resulting left endpoint, and subtracts the left endpoint of Y from the right endpoint of X and rounds up to produce a resulting right endpoint.

The multiplication operation selects the minimum value of four different terms (rounded down) to produce the resulting left endpoint. These terms are: the left endpoint of X multiplied by the left endpoint of Y; the left endpoint of X multiplied by the right endpoint of Y; the right endpoint of X multiplied by the left endpoint of Y; and the right endpoint of X multiplied by the right endpoint of Y. This multiplication operation additionally selects the maximum of the same four terms (rounded up) to produce the resulting right endpoint.

Similarly, the division operation selects the minimum of four different terms (rounded down) to produce the resulting left endpoint. These terms are: the left endpoint of X divided by the left endpoint of Y; the left endpoint of X divided by the right endpoint of Y; the right endpoint of X divided by the left endpoint of Y; and the right endpoint of X divided by the right endpoint of Y. This division operation additionally selects the maximum of the same four terms (rounded up) to produce the resulting right endpoint. For the special case where the interval Y includes zero, X/Y is an exterior interval that is nevertheless contained in the interval R*.

Note that the result of any of these interval operations is the empty interval if either of the intervals, X or Y, are the empty interval. Also note, that in one embodiment of the present invention, extended interval operations never cause undefined outcomes, which are referred to as "exceptions" in the IEEE 754 standard.

Mask-driven Interval Division

Figure 6:
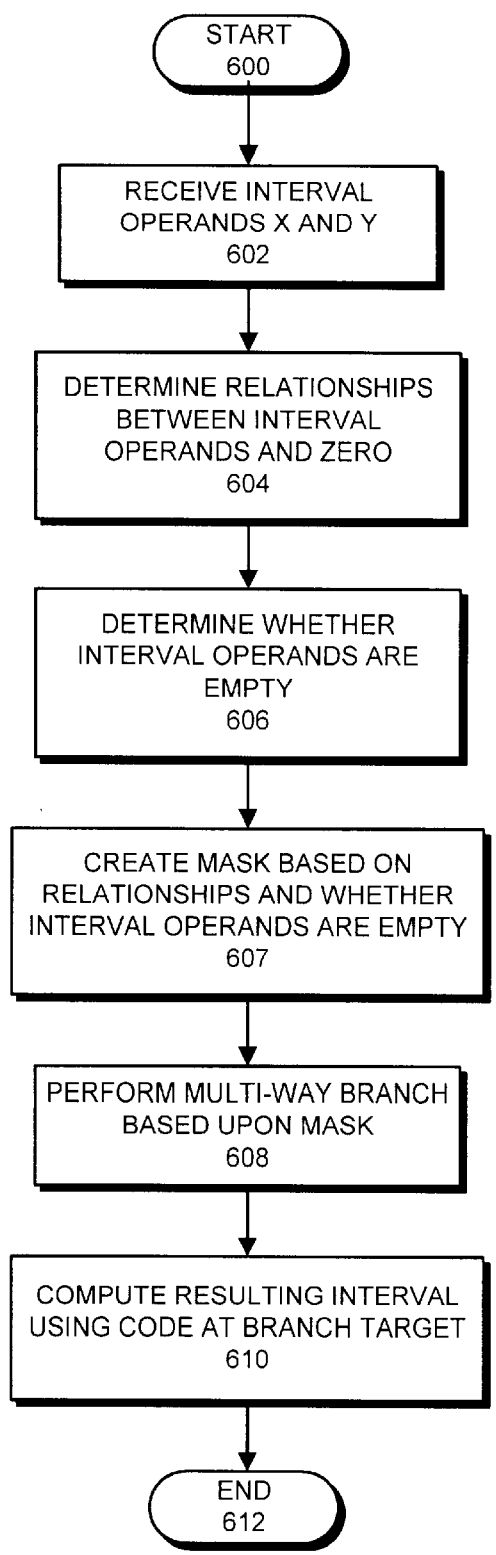
FIG. 6 is a flow chart illustrating the process of performing a mask-driven interval division operation in accordance with an embodiment of the present invention.

FIG. 6 is a flow chart illustrating the process of performing a mask-driven interval division operation in accordance with an embodiment of the present invention. The system starts by receiving interval operands X and Y that are to be divided to produce a resulting interval P=X/Y (step 602). Next, the system performs a number of tests to determine relationships between the interval operands, X and Y, and zero (step 604). This process is described in more detail below with reference to Table 1 and FIG. 7. The system also determines whether either of the interval operands, X or Y, are empty (step 606).

Next, the system creates a mask (index) based upon the determined relationships, and based upon whether the interval operands are empty (step 607). This mask is used to perform a multi-way branch operation, so that the execution flow of a program performing the division operation is directed to the code that computes the resulting interval for different values of the interval operands, and for cases where either interval operand, X or Y, is empty (step 608).

Next, the system computes the resulting interval by executing the code at the branch target (step 610).

Note that by constructing a mask and then performing a single multi-way branch operation, a large series of "if" statements are avoided. This speeds up the process of performing the interval division operation.

FIG. 7 illustrates how the result of the division operation is computed in accordance with an embodiment of the present invention.

If either of the interval operands, X or Y, is empty, the resulting interval, P, is also empty.

If X>0 and Y>0, the endpoints of both X and Y are positive. Hence, the smallest possible value of the resulting interval is inf(P)=inf(X)/sup(Y). Conversely, the largest possible value for the resulting interval is sup(P)=sup(x)/sup(Y). (Note that this discussion assumes that inf(P) will be rounded down to the nearest smaller floating point number and sup(P) will be rounded up to the nearest larger floating point number only if their exact value is not machine representable.)

If X>0 and Y<0, the endpoints of X are positive and the endpoints of Y are negative. Hence, the resulting interval will be negative, and the smallest possible value of the resulting interval is the largest magnitude negative value, which is inf(P)=sup(X)/sup(Y). Conversely, the largest possible value for the resulting interval is the smallest magnitude negative value, which is sup(P)=inf(X)/inf(Y). (Recall that for a negative interval Y<0, inf(Y) is the largest magnitude negative number, and sup(Y) is the smallest magnitude negative number.)

If X<0 and Y>0, the endpoints of X are negative and the endpoints of Y are positive. Hence, the resulting interval will be negative, and the smallest possible value of the resulting interval is the largest magnitude negative value, which is inf(P)=inf(X)/inf(Y). Conversely, the largest possible value for the resulting interval is the smallest magnitude negative value, which is sup(P)=sup(X)/sup(Y).

If X<0 and Y<0, the endpoints of X are negative and the endpoints of Y are negative. Hence, the resulting interval will be positive, and the smallest possible value of the resulting interval is the smallest magnitude positive value, which is inf(P)=sup(X)/inf(Y). Conversely, the largest possible value for the resulting interval is the largest magnitude positive value, which is sup(P)=inf(X)/sup(Y).

Next, if 0 is in X and Y>0, the endpoints of X straddle zero and the endpoints of Y are positive. Hence, the resulting interval will straddle zero, and the smallest possible value of the resulting interval is the largest magnitude negative value, which is inf(P)=inf(X)/inf(Y). Conversely, the largest possible value for the resulting interval is the largest magnitude positive value, which is sup(P)=sup(X)/inf(Y).

TABLE 1

```
set_ieee_rounding_mode_to_positive_infinity;
idx = (xl > 0)?8:(xu < 0)?4:(xl==xl)?0:32;
idx |= (yl > 0)?2:(yu < 0)?1:(yl==yl)?0:16;
switch(idx)
{
    case 10:        /* X > 0 and Y > 0 */
            l = -(-xl/yu);
            u = xu/yl;
            break;
    case 9:         /* X > 0 and Y < 0 */
            l = -(-xu/yu);
            u = xl/yl;
            break;
    case 6:         /* X < 0 and Y > 0 */
            l = -(-xl/yl);
            u = xu/yu;
            break;
    case 5:         /* X < 0 and Y < 0 */
            l = -(-xu/yl);
            u = xl/yu;
            break;
    case 2:         /* 0 in X and Y > 0 */
            l = -(-xl/yl);
            u = xu/yl;
            break;
    case 1:         /* 0 in X and Y < 0 */
            l = -(-xu/yu);
            u = xl/yu;
            break;
    case 16:        /* Y = EMPTY */
    case 20:        /* Y = EMPTY */
    case 24:        /* Y = EMPTY */
            l = u = yl;
            break;
    case 32:        /* X = EMPTY */
    case 33:        /* X = EMPTY */
    case 34:        /* X = EMPTY */
    case 48:        /* X = EMPTY and Y = EMPTY */
            l = u = xl;
            break;
    default:        /* 0 in Y or an invalid index */
            l = - (u = INF);
}
return [l,u];
```

Next, if 0 is in X and Y<0, the endpoints of X straddle zero and the endpoints of Y are negative. Hence, the resulting interval will straddle zero, and the smallest possible value of the resulting interval is the largest magnitude negative value, which is inf(P)=sup(X)/sup(Y). Conversely, the largest possible value for the resulting interval is the largest magnitude positive value, which is sup(P)=inf(X)/sup(Y).

Next, if 0 is in Y, X/Y is an exterior interval that is nevertheless contained in the interval R*. Hence, the resulting interval, P, is set to R*, which means that inf(P)=−∞ and sup(P)=+∞.

Sample Pseudo-code

Table 1 presents an example of pseudo-code to perform a mask-driven interval division operation in accordance with an embodiment of the present invention.

The first few lines of Table 1 set the rounding mode and create the index (mask). Next, a switch statement performs a multi-way branch operation. Note that a NaN (not a number) is detected by testing to see if a value is equal to itself. If a value is not equal to itself, this indicates that the value is a NaN. (IEEE standard 754 specifies a special exponent value to represent a NaN. A default NaN value can be generated as the result of an undefined operation, such as dividing by zero, an underflow or an overflow.)

Also note that the expression l=−(u=INF) sets the left endpoint of the resulting to negative infinity and the right endpoint to positive infinity. Hence, P=R*.

Furthermore, note that the results for case 1 and case 2 assume that non-default NaN operations propagate during a division operation.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing a division operation between arithmetic intervals within a computer system, comprising:
   receiving interval operands, including a first interval and a second interval, wherein the first interval is to be divided by the second interval to produce a resulting interval;
   determining relationships between the interval operands and zero;
   creating a mask based upon the relationships; and
   performing a multi-way branch based upon the mask, so that an execution flow of a program performing the division operation is directed to code that is tailored to compute the resulting interval for specific relationships between the interval operands and zero.

2. The method of claim 1,
   wherein creating the mask additionally involves,
   determining whether the first interval is empty,
   modifying the mask depending upon whether the first interval is empty,
   determining whether the second interval is empty, and modifying the mask depending upon whether the second interval is empty; and
   wherein performing the multi-way branch involves directing the execution flow of the program to code that is tailored to compute the resulting interval, depending upon whether the first interval is empty and depending upon whether the second interval is empty.

3. The method of claim 2, wherein if the first interval is empty or if the second interval is empty, the multi-way branch directs the execution flow of the program to code that sets the resulting interval to be empty.

4. The method of claim 1, wherein if the first interval is greater than zero and the second interval is greater than zero, performing the multi-way branch directs the execution flow of the program to code that:
   computes a left endpoint of the resulting interval as a left endpoint of the first interval divided by a right endpoint of the second interval; and
   computes a right endpoint of the resulting interval as a right endpoint of the first interval divided by a left endpoint of the second interval.

5. The method of claim 1, wherein if the first interval is greater than zero and the second interval is less than zero, performing the multi-way branch directs the execution flow of the program to code that:
   computes a left endpoint of the resulting interval as a right endpoint of the first interval divided by a right endpoint of the second interval; and
   computes a right endpoint of the resulting interval as a left endpoint of the first interval divided by a left endpoint of the second interval.

6. The method of claim 1, wherein if the first interval is less than zero and the second interval is greater than zero, performing the multi-way branch directs the execution flow of the program to code that:
   computes a left endpoint of the resulting interval as a left endpoint of the first interval divided by a left endpoint of the second interval; and
   computes a right endpoint of the resulting interval as a right endpoint of the first interval divided by a right endpoint of the second interval.

7. The method of claim 1, wherein if the first interval is less than zero and the second interval is less than zero, performing the multi-way branch directs the execution flow of the program to code that:
   computes a left endpoint of the resulting interval as a right endpoint of the first interval divided by a left endpoint of the second interval; and
   computes a right endpoint of the resulting interval as a left endpoint of the first interval divided by a right endpoint of the second interval.

8. The method of claim 1, wherein if the first interval includes zero and the second interval is greater than zero, performing the multi-way branch directs the execution flow of the program to code that:
   computes a left endpoint of the resulting interval as a left endpoint of the first interval divided by a left endpoint of the second interval; and
   computes a right endpoint of the resulting interval as a right endpoint of the first interval divided by a left endpoint of the second interval.

9. The method of claim 1, wherein if the first interval includes zero and the second interval is less than zero, performing the multi-way branch directs the execution flow of the program to code that:
   computes a left endpoint of the resulting interval as a right endpoint of the first interval divided by a right endpoint of the second interval; and
   computes a right endpoint of the resulting interval as a left endpoint of the first interval divided by a right endpoint of the second interval.

10. The method of claim 1, additionally comprising, if either the left endpoint or the right endpoint of the resulting interval is set to a default NaN value, setting the left endpoint of the resulting interval to negative infinity, and setting the right endpoint of the resulting interval to positive infinity.

11. The method of claim 1, wherein if the second interval includes zero, performing the multi-way branch directs the execution flow of the program to code that:
   sets the left endpoint of the resulting interval to negative infinity; and
   sets the right endpoint of the resulting interval to positive infinity.

12. A computer-readable storage medium storing instructions that when executed by a computer cause the computer to perform a method for performing a division operation between arithmetic intervals within a computer system, the method comprising:
   receiving interval operands, including a first interval and a second interval, wherein the first interval is to be divided by the second interval to produce a resulting interval;
   determining relationships between the interval operands and zero;
   creating a mask based upon the relationships; and
   performing a multi-way branch based upon the mask, so that an execution flow of a program performing the division operation is directed to code that is tailored to compute the resulting interval for specific relationships between the interval operands and zero.

13. The computer-readable storage medium of claim 12, wherein creating the mask additionally involves,
   determining whether the first interval is empty,
   modifying the mask depending upon whether the first interval is empty,
   determining whether the second interval is empty, and
   modifying the mask depending upon whether the second interval is empty; and
   wherein performing the multi-way branch involves directing the execution flow of the program to code that is tailored to compute the resulting interval, depending upon whether the first interval is empty and depending upon whether the second interval is empty.

14. The computer-readable storage medium of claim 13, wherein if the first interval is empty or if the second interval is empty, the multi-way branch directs the execution flow of the program to code that sets the resulting interval to be empty.

15. The computer-readable storage medium of claim 12, wherein if the first interval is greater than zero and the second interval is greater than zero, performing the multi-way branch directs the execution flow of the program to code that:
   computes a left endpoint of the resulting interval as a left endpoint of the first interval divided by a right endpoint of the second interval; and
   computes a right endpoint of the resulting interval as a right endpoint of the first interval divided by a left endpoint of the second interval.

16. The computer-readable storage medium of claim 12, wherein if the first interval is greater than zero and the second interval is less than zero, performing the multi-way branch directs the execution flow of the program to code that:
   computes a left endpoint of the resulting interval as a right endpoint of the first interval divided by a right endpoint of the second interval; and
   computes a right endpoint of the resulting interval as a left endpoint of the first interval divided by a left endpoint of the second interval.

17. The computer-readable storage medium of claim 12, wherein if the first interval is less than zero and the second interval is greater than zero, performing the multi-way branch directs the execution flow of the program to code that:
   computes a left endpoint of the resulting interval as a left endpoint of the first interval divided by a left endpoint of the second interval; and
   computes a right endpoint of the resulting interval as a right endpoint of the first interval divided by a right endpoint of the second interval.

18. The computer-readable storage medium of claim 12, wherein if the first interval is less than zero and the second interval is less than zero, performing the multi-way branch directs the execution flow of the program to code that:
   computes a left endpoint of the resulting interval as a right endpoint of the first interval divided by a left endpoint of the second interval; and
   computes a right endpoint of the resulting interval as a left endpoint of the first interval divided by a right endpoint of the second interval.

19. The computer-readable storage medium of claim 12, wherein if the first interval includes zero and the second interval is greater than zero, performing the multi-way branch directs the execution flow of the program to code that:
   computes a left endpoint of the resulting interval as a left endpoint of the first interval divided by a left endpoint of the second interval; and
   computes a right endpoint of the resulting interval as a right endpoint of the first interval divided by a left endpoint of the second interval.

20. The computer-readable storage medium of claim 12, wherein if the first interval includes zero and the second interval is less than zero, performing the multi-way branch directs the execution flow of the program to code that:
   computes a left endpoint of the resulting interval as a right endpoint of the first interval divided by a right endpoint of the second interval; and
   computes a right endpoint of the resulting interval as a left endpoint of the first interval divided by a right endpoint of the second interval.

21. The computer-readable storage medium of claim 12, wherein the method additionally comprises, if either the left endpoint or the right endpoint of the resulting interval is set to a default NaN value, setting the left endpoint of the resulting interval to negative infinity, and setting the right endpoint of the resulting interval to positive infinity.

22. The computer-readable storage medium of claim 12, wherein if the second interval includes zero, performing the multi-way branch directs the execution flow of the program to code that:
   sets the left endpoint of the resulting interval to negative infinity; and
   sets the right endpoint of the resulting interval to positive infinity.

23. An apparatus that performs a division operation between arithmetic intervals within a computer system, comprising:
   a receiving mechanism that is configured to receive interval operands, including a first interval and a second interval, wherein the first interval is to be divided by the second interval to produce a resulting interval;

a determining mechanism that is configured to determine relationships between the interval operands and zero;

a mask creation mechanism that is configured to create a mask based upon the relationships; and a branching mechanism that is configured to perform a multi-way branch based upon the mask, so that an execution flow of a program performing the division operation is directed to code that is tailored to compute the resulting interval for specific relationships between the interval operands and zero.

24. The apparatus of claim 23, wherein the mask creation mechanism is additionally configured to,
determine whether the first interval is empty,
modify the mask depending upon whether the first interval is empty,
determine whether the second interval is empty, and to modify the mask depending upon whether the second interval is empty; and wherein the branching mechanism is configured to direct the execution flow of the program to code that is tailored to compute the resulting interval, depending upon whether the first interval is empty and depending upon whether the second interval is empty.

25. The apparatus of claim 24, wherein if the first interval is empty or if the second interval is empty, the branching mechanism is configured to direct the execution flow of the program to code that sets the resulting interval to be empty.

26. The apparatus of claim 23, wherein if the first interval is greater than zero and the second interval is greater than zero, the branching mechanism is configured to direct the execution flow of the program to code that:

computes a left endpoint of the resulting interval as a left endpoint of the first interval divided by a right endpoint of the second interval; and computes a right endpoint of the resulting interval as a right endpoint of the first interval divided by a left endpoint of the second interval.

27. The apparatus of claim 23, wherein if the first interval is greater than zero and the second interval is less than zero, the branching mechanism is configured to direct the execution flow of the program to code that:

computes a left endpoint of the resulting interval as a right endpoint of the first interval divided by a right endpoint of the second interval; and computes a right endpoint of the resulting interval as a left endpoint of the first interval divided by a left endpoint of the second interval.

28. The apparatus of claim 23, wherein if the first interval is less than zero and the second interval is greater than zero, the branching mechanism is configured to direct the execution flow of the program to code that:

computes a left endpoint of the resulting interval as a left endpoint of the first interval divided by a left endpoint of the second interval; and computes a right endpoint of the resulting interval as a right endpoint of the first interval divided by a right endpoint of the second interval.

29. The apparatus of claim 23, wherein if the first interval is less than zero and the second interval is less than zero, the branching mechanism is configured to direct the execution flow of the program to code that:

computes a left endpoint of the resulting interval as a right endpoint of the first interval divided by a left endpoint of the second interval; and computes a right endpoint of the resulting interval as a left endpoint of the first interval divided by a right endpoint of the second interval.

30. The apparatus of claim 23, wherein if the first interval includes zero and the second interval is greater than zero, the branching mechanism is configured to direct the execution flow of the program to code that:

computes a left endpoint of the resulting interval as a left endpoint of the first interval divided by a left endpoint of the second interval; and computes a right endpoint of the resulting interval as a right endpoint of the first interval divided by a left endpoint of the second interval.

31. The apparatus of claim 23, wherein if the first interval includes zero and the second interval is less than zero, the branching mechanism is configured to direct the execution flow of the program to code that:

computes a left endpoint of the resulting interval as a right endpoint of the first interval divided by a right endpoint of the second interval; and computes a right endpoint of the resulting interval as a left endpoint of the first interval divided by a right endpoint of the second interval.

32. The apparatus of claim 23, wherein if either the left endpoint or the right endpoint of the resulting interval is set to a default NaN value, the apparatus is additionally configured to set the left endpoint of the resulting interval to negative infinity, and to set the right endpoinit of the resulting interval to positive infinity.

33. The apparatus of claim 23, wherein if the second interval includes zero, the branching mechanism is configured to direct the execution flow of the program to code that:

sets the left endpoint of the resulting interval to negative infinity; and sets the right endpoint of the resulting interval to positive infinity.

34. A method for compiling code to perform a division operation between interval operands to produce a resulting interval, comprising:

receiving source code for an application within a compiler;

wherein the source code contains the division operation between interval operands, including a first interval and a second interval, wherein the first interval is to be divided by the second interval to produce the resulting interval; and creating executable code for the division operation that, determines relationships between the interval operands and zero,
creates a mask based upon the relationships, and
performs a multi-way branch based upon the mask, so that an execution flow of a program performing the division operation is directed to code that is tailored to compute the resulting interval for specific relationships between the interval operands and zero.

35. The method of claim 34, wherein creating the mask additionally involves,
determining whether the first interval is empty,
modifying the mask depending upon whether the first interval is empty,
determining whether the second interval is empty, and modifying the mask depending upon whether the second interval is empty; and wherein performing the multi-way branch involves directing the execution flow of the program to code that is tailored to compute the resulting interval, depending upon whether the first interval is empty and depending upon whether the second interval is empty.

36. The method of claim 35, wherein if the first interval is empty or if the second interval is empty, the multi-way branch directs the execution flow of the program to code that sets the resulting interval to be empty.

37. The method of claim 34, wherein if the first interval is greater than zero and the second interval is greater than zero, performing the multi-way branch directs the execution flow of the program to code that:
  computes a left endpoint of the resulting interval as a left endpoint of the first interval divided by a right endpoint of the second interval; and
  computes a right endpoint of the resulting interval as a right endpoint of the first interval divided by a left endpoint of the second interval.

38. The method of claim 34, wherein if the first interval is greater than zero and the second interval is less than zero, performing the multi-way branch directs the execution flow of the program to code that:
  computes a left endpoint of the resulting interval as a right endpoint of the first interval divided by a right endpoint of the second interval; and
  computes a right endpoint of the resulting interval as a left endpoint of the first interval divided by a left endpoint of the second interval.

39. The method of claim 34, wherein if the first interval is less than zero and the second interval is greater than zero, performing the multi-way branch directs the execution flow of the program to code that:
  computes a left endpoint of the resulting interval as a left endpoint of the first interval divided by a left endpoint of the second interval; and
  computes a right endpoint of the resulting interval as a right endpoint of the first interval divided by a right endpoint of the second interval.

40. The method of claim 34, wherein if the first interval is less than zero and the second interval is less than zero, performing the multi-way branch directs the execution flow of the program to code that:
  computes a left endpoint of the resulting interval as a right endpoint of the first interval divided by a left endpoint of the second interval; and
  computes a right endpoint of the resulting interval as a left endpoint of the first interval divided by a right endpoint of the second interval.

41. The method of claim 34, wherein if the first interval includes zero and the second interval is greater than zero, performing the multi-way branch directs the execution flow of the program to code that:
  computes a left endpoint of the resulting interval as a left endpoint of the first interval divided by a left endpoint of the second interval; and
  computes a right endpoint of the resulting interval as a right endpoint of the first interval divided by a left endpoint of the second interval.

42. The method of claim 34, wherein if the first interval includes zero and the second interval is less than zero, performing the multi-way branch directs the execution flow of the program to code that:
  computes a left endpoint of the resulting interval as a right endpoint of the first interval divided by a right endpoint of the second interval; and
  computes a right endpoint of the resulting interval as a left endpoint of the first interval divided by a right endpoint of the second interval.

43. The method of claim 34, additionally comprising, if either the left endpoint or the right endpoint of the resulting interval is set to a default NaN value, setting the left endpoint of the resulting interval to negative infinity, and setting the right endpoint of the resulting interval to positive infinity.

44. The method of claim 34, wherein if the second interval includes zero, performing the multi-way branch directs the execution flow of the program to code that:
  sets the left endpoint of the resulting interval to negative infinity; and
  sets the right endpoint of the resulting interval to positive infinity.

45. A computer-readable storage medium storing instructions that when executed by a computer cause the computer to perform a method for compiling code to perform a division operation between interval operands to produce a resulting interval, the method comprising:
  receiving source code for an application within a compiler;
  wherein the source code contains the division operation between interval operands, including a first interval and a second interval, wherein the first interval is to be divided by the second interval to produce the resulting interval; and
  creating executable code for the division operation that,
    determines relationships between the interval operands and zero,
    creates a mask based upon the relationships, and
    performs a multi-way branch based upon the mask, so that an execution flow of a program performing the division operation is directed to code that is tailored to compute the resulting interval for specific relationships between the interval operands and zero.

* * * * *